July 22, 1958 W. H. RICHARDS 2,843,951
AUTOMATIC TRANSPORT SYSTEM FOR SLIDE PROJECTORS
Filed March 2, 1954 2 Sheets-Sheet 2

INVENTOR.
WILLIAM H. RICHARDS
BY Jerome P. Bloom
Wade Koontz AND
ATTORNEYS

United States Patent Office 2,843,951
Patented July 22, 1958

2,843,951

AUTOMATIC TRANSPORT SYSTEM FOR SLIDE PROJECTORS

William H. Richards, Dayton, Ohio

Application March 2, 1954, Serial No. 413,732

7 Claims. (Cl. 40—36)

(Granted under Title 35, U. S. Code (1952), sec. 266)

The invention described herein may be manufactured and used by or for the United States Government for governmental purposes without payment to me of any royalty thereon.

This invention relates to an improved slide transport mechanism for slide projectors. The invention apparatus as shown herein is directed to an improved slide transport mechanism particularly related to stereo slide carriers of a magazine type. It is of exceeding importance particularly in the use of stereo slides that they be properly and positively aligned when presented for viewing since a slight tilt can well cause a distorted picture with accompanying discomfort to the viewer. Successful stereo-projection requires that the two images in a slide shall be in a true horizontal plane with each other when projected on a screen. Also the stereo-slide must be presented in a true vertical plane to maintain a correct focus. The invention apparatus presented herein provides a highly simplified mechanism for a timed engagement and projection of slides from a movable carrier which is more efficient and positive than any similar mechanism now known in the prior art and considerably more economical from a production aspect presenting a distinct advance in the slide projector art.

Moreover, also of major importance, the novel slide holding apparatus presented by subject invention in projection of a slide for viewing enables complete viewing with no adverse effect on the slide per se by the holding apparatus. The above-mentioned advantages and many others resulting from the improved slide transport and viewing mechanism will be readily apparent to those skilled in the art from the detailed description thereof presented herein.

An object of this invention is to provide an improved simplified slide transport mechanism for slide projectors of the magazine type.

A further object of this invention is to provide a simplified reciprocating slide holder mechanism with spring biased holding means for positive alignment control of the slides for viewing.

Another object of the invention is to provide an improved slide transport mechanism with an automatic control therefor in combination with a drum type slide magazine movable in timed relation therewith whereby an improved slide viewing apparatus obtains.

An additional object of the invention is to provide a new and novel automatic slide transport mechanism for stereo-slides in combination with a slotted type slide carrier whereby full unobstructed viewing may positively obtain.

Other objects and advantages will be readily apparent to those versed in the art from the following description taken in conjunction with the accompanying drawings wherein.

Figure 1:
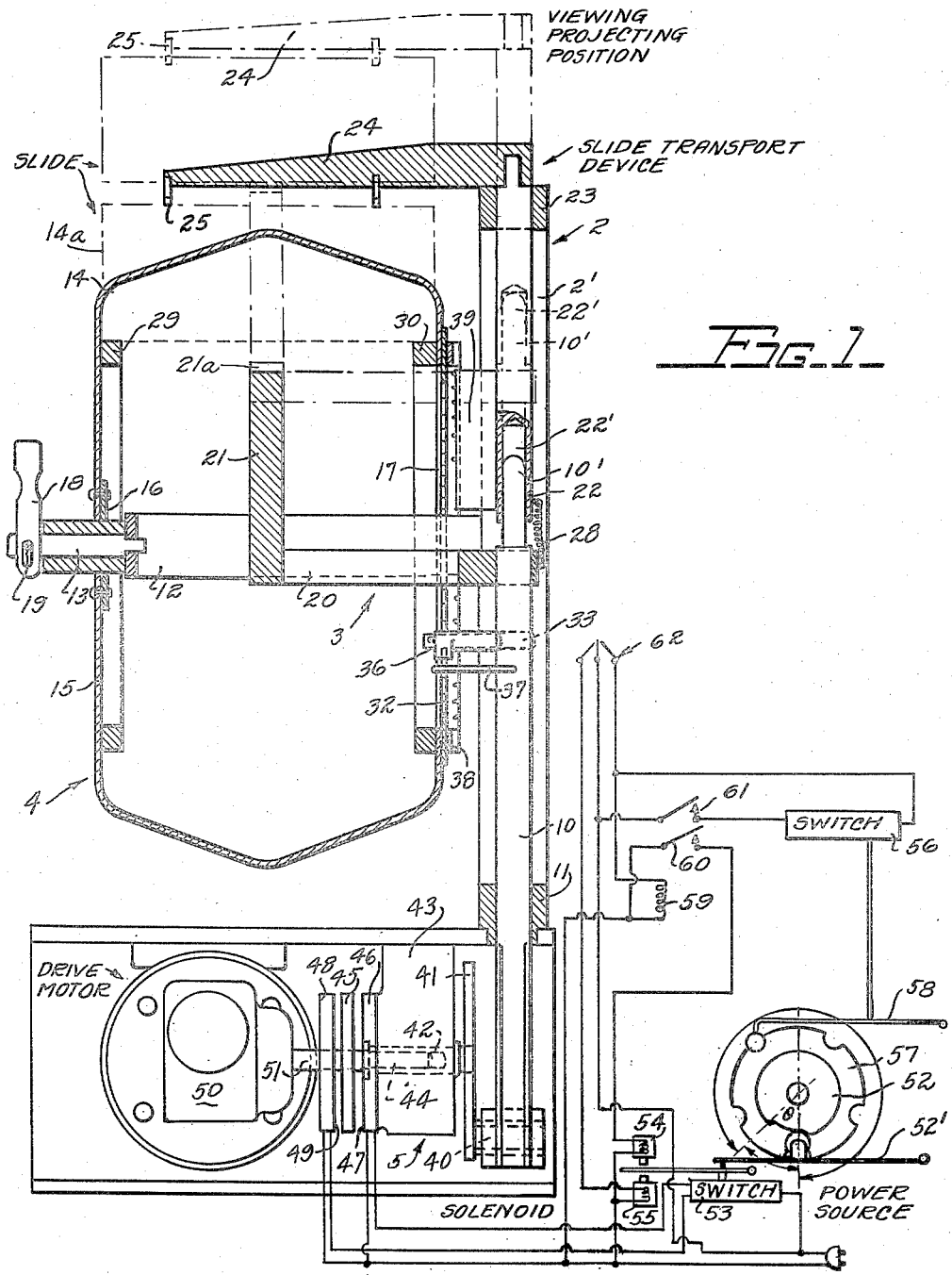
Fig. 1 is a sectional view of the invention apparatus shown partially in diagrammatic fashion.
Figure 2:
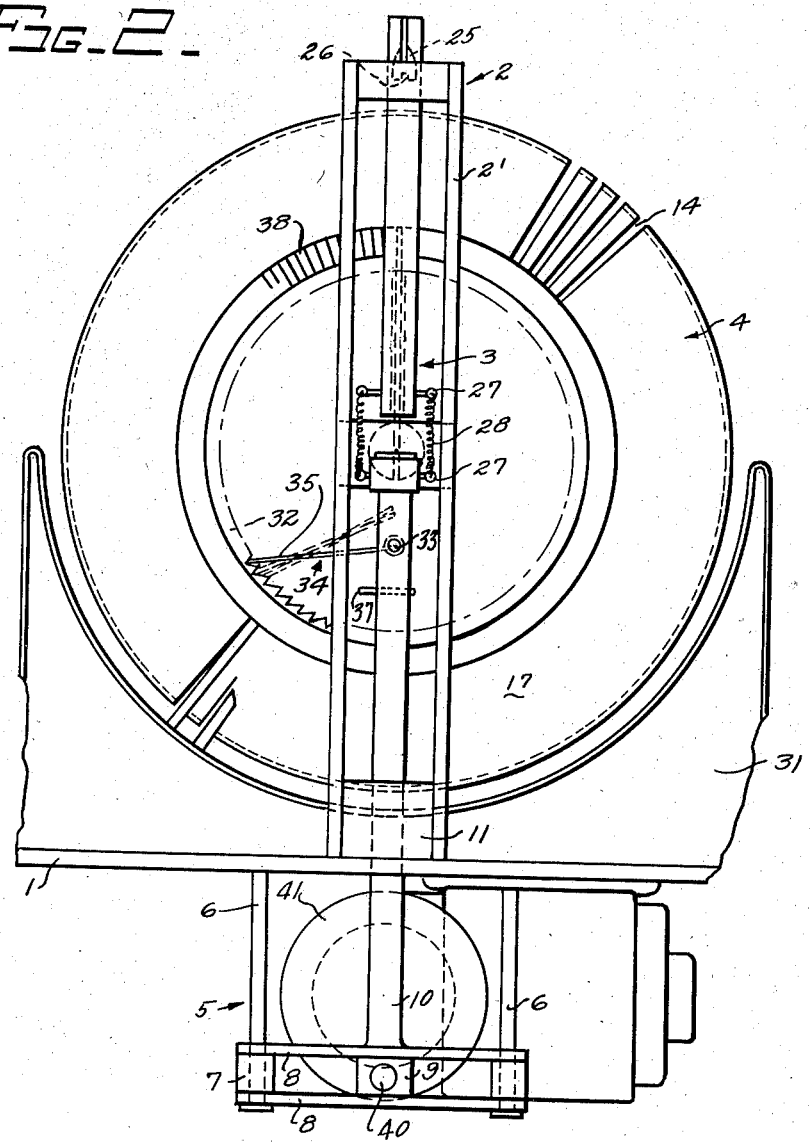
Fig. 2 is a side view of the invention apparatus as shown in Fig. 1 with omission of certain portions thereof for clarity.

The invention apparatus consists generally of a platform 1 having a hollow upright support structure 2 comprising two vertical plate members 2' secured thereto as by welding or in any suitable manner in which is mounted the novel slide transport mechanism 3 and which rotatably supports a drum type slide magazine 4. Also mounted on the platform 1 is an automatic drive mechanism 5 to provide an automatic timed control of the slide magazine and the slide transport mechanism. Supported in depending relation from platform 1 are rods 6 bolted to the platform 1. Mounted on the rods 6 respectively are tubular guide elements 7 transversely connected by bars 8 which are apertured to receive the rods 6 therethrough the bars together with the tbular guide elements 7 constituting a guide frame. A slide block 9 is mounted for sliding transverse movement between the bars of the guide frame. A rod 10 is connected to the upper bar of the guide frame to extend upward within the upright support 2 between the side plates 2'. A guide block 11 in fixed relation to the platform 1 and connecting the side plates 2' provides a lower bearing housing for rod 10 within the upright support 2. Spaced from the surface of platform 1 and parallel thereto is a U-shaped side extension 12 from vertical support 2 having the closed end of the U at its outer extremity. Integral with the closed end of the U and forming an axial extension of member 12 is a pivot arm 13; the pivot arm 13 and the member 12 form an open framework. Mounted for rotation on pivot arm 13 is the drum or cage type magazine 4 consisting of a hollow cage slotted transversely in equidistantly spaced fashion about its periphery to provide slide apertures 14. The cross section of the drum in Fig. 1 shows that the periphery tapers to a peak at its central portion. The outer side 15 of the drum has a hub member 16 bolted thereto surrounding an aperture centrally thereof, while the inner side 17 of the drum is open. The drum is accordingly mounted by its hub member on pivot arm 13. The pivot arm 13 on its outer end pivotally receives a lock bar 18 having a slot therein connected by a transverse pivot pin 19 extending through the slot to the arm. On slipping the drum on the arm 13 the lock bar which is axially extended can be pivoted on the pin 19 and dropped into the position shown in Fig. 1 of the drawings to lock the drum in place. Fixed to the rod 10 at the level of member 12 is a horizontally extending bar member 20 extending between the legs of the U-shaped member 12 to a point centrally of the drum 4. Fixed to the end of member 20 is a vertically upright support arm 21 which may be welded or otherwise secured to member 20. The member 21 is vertically aligned with the vertical axis of the drum as shown in Fig. 1 of the drawings. The upper surface of the arm member 21 has a slight notch 21a in it adapted to engage the bottom of a slide 14a. The rod 10 above the horizontal arm 20 is reduced in diameter at 10'. Slidably mounted on this reduced portion of rod 10 is a rod extension 22 having a hollow portion 22' at its lower extremity to receive the reduced portion of rod 10. The rod member 22 extends up through a guide block 23 in the upper end of support 2 connecting the side plates 2' which serves as a bearing for the rod extension. The rod extension 22 is reduced in diameter directly above the support 2 to receive a second horizontal arm 24 apertured to receive the reduced portion of the rod extension and be secured thereto in any suitable manner. Secured to the lower portion of arm 24 which is aligned in the vertical plane of arm 20 and support 21 are two depending engaging elements 25 notched in the under surfaces at 26. The notch in the support arm 21 and the notches at 26 are all arranged to lie in a single plane with the notches 26 aligned and equidistantly spaced relative to the notch in arm 21. Hook elements 27 are respectively connected to the lower rod 10 at the level of extension arm 20 and to the rod extension 22 in spaced relation. Spring elements 28 connect the respective hook elements to tend to strongly bias the rod extension 22 toward the rod 10. Ring members 29 and 30 are secured to the inner walls of the drum to serve as reinforcing members for the drum and also to serve to limit the inward movement of the slides mounted in the drum. Ring member 30 defines the opening in the inner side 17 of the drum.

A slide guide 31 having a semicylindrical upper surface is mounted on platform 1 and bolted thereto so as to provide such upper surface in concentric spaced relation to the periphery of the drum to prevent the slides mounted in the slots in the lower half of the drum from falling out of the slots when mounted in operative relation to the slide transfer mechanism.

On the outer wall of the drum facing the support 2 is secured in any suitable manner a flat ring member 32 having teeth about its inner periphery to provide a ratchet ring. Pivoted to rod 10 by pin 33 thereon is a dog member 34 having an arm 35 and a dog projection 36. A stop pin 37 is secured in the rod 10 to cooperate with the dog member to limit the movement of the dog member about pin 33. The outer end of the dog projection 36 cooperates with the ratchet ring member 32 to provide the intermittent rotation of the drum. A further notched ring 38 is superimposed on ratchet ring member 32 with its teeth at right angles thereto providing an index ring. A lock member 39 mounted on rod extension 22 cooperates with the indexing ring 38 to enter a slot between the teeth therein to fix the position of the drum as will be described herein.

Journalled in the slide 9 is a crank pin 40 fixed to a rotatable control plate 41 adjacent its periphery. The control plate 41 is driven by shaft 42 journalled in a bearing 43 mounted on platform 1. The opposite end of the shaft 42 has a splined bore receiving an axially shiftable complementary splined drive shaft 44. The other end of the splined drive shaft 44 has a ferrous metal armature drive disk 45 fixedly secured thereto in any suitable manner. Secured to the bearing 43 and axially aligned with the disk member 45 is a stationary magnet 46 having a friction face 47. The shaft 44 of the drive element 45 extends through magnet 46 to the bearing 43. Axially aligned with the driving disk and normally spaced therefrom is a power driven magnet 48 having a friction face 49 opposed to drive disk 45. The magnet 48 is driven from motor 50 through a drive shaft 51 to which it is secured. Geared to the drive motor 50 as shown diagrammatically in Fig. 1 of the drawings is a cam 52 shaped to control a switch 53 through a switch arm 52', having a cam follower connected therewith in the form of a roller riding on the cam to alternately energize stationary magnet 46 and drive magnet 48 in timed relation to control viewing time. The cam 52 has a section of reduced radius as can be seen in Fig. 1 that defines an angle $\theta$. This section is the portion that controls the retraction of a slide 14a and projection of another while the rest of the cam surface defines the viewing time. An overriding clutch control switch 62 providing means to control the switch 53 irrespective of the cam 52 is shown in Fig. 1 of the drawings. This is accomplished by solenoids 54 and 55 being respectively energized by placing the switch in the respective positions to the left or right as shown, the solenoid 55 controlling to obtain continued viewing as will be described herein, and the solenoid 54 in conjunction with switch 56 controlled by cam 57 through switch arm 58 functioning to obtain rapid cycling eliminating the viewing delay as will be described. The switch 62 thus is provided to interrupt the automatic viewing cycle where desired.

The manner in which the novel improved slide viewing apparatus functions is as follows: The motor 50 is started to simultaneously drive magnet 48 and cam 52 and cam 57. The cam 52 as the switch arm is engaged in its reduced position, actuates switch 53 to energize the drive magnet 48 which attracts and frictionally engages ferrous disk 45 which through its splined engagement through shaft 44 affords a driving engagement of shaft 42 which has the control disk 41 rotating therewith. The crankpin 40, on the disk 41, journalled in slide 9 raises the guide frame as it rotates lifting the rod 10 by such movement as will be obvious by reference to the drawings. As rod 10 moves up it carries the integral horizontal bar member 20 with its upright support arm 21 having a notch in the upper surface thereof into engagement with the bottom of a slide 14a mounted in a slot in the drum 4. As the slide 14a is moved upward thereby, the upper surface of the slide engages the spaced notched members 25 on the upper horizontal arm 24. This results in a three point securing of the slide with no picture interference. Continued rotation of the crankpin 40 causes the rod extension 22 controlled by the slide engagement of arm 24 to move upwardly with rod 10 until an upper viewing position of the slide is reached. As the rod extension 22 moves upwardly the spring elements 28 continue to positively bias the rod extension 22 toward the rod 10 to ensure positive holding of the slide by members 25 against the support arm 21. Also in the upward movement the lock member 39 on rod 22 engages in a slot between the teeth on the indexing ring 38 to hold the fixed position of drum 4 for viewing. At this point the switch arm 52' rides up on the cam 52 to energize the holding magnet 46 and deenergize the driving magnet 48, the plate 45 being attracted to holding magnet 46 to prevent movement of the slide transport mechanism from a viewing position until the cam 52 operates switch 53 to retract the slide and project another. Thus after the predetermined period for lifting the slide to a view position the cam permits return of the switch to its normal position which energizes the stationary magnet 46 as it deenergizes magnet 48. This holds the slide in its lifted or viewing position for a predetermined time period as determined by the cam 52.

Reduction gearing is utilized in the driving of the drive magnet.

At the end of the predetermined viewing time, the drive magnet is again energized to drive the crank 40 to guide the guide frame and associated rods 10 and 22 downward. In the downward movement the lock 39 disengages from indexing ring 38, the rod 22 moving until it, by arm 24, engages the block 23 in support 2 which limits its travel and the rod 10 continues down alone supporting the slide back into its slot, the bottom extremities of the slide engaging ring members 29 and 30. Also the dog member 34 which in the upward movement of rod 10 was caused to pivot so the dog projection 36 slipped down to a succeeding notch in the ratchet ring member 32, as it engaged the limit pin 37, pivots upwardly as the rod 10 passes a predetermined position to apply an increment of rotation to the drum 4 through the ratchet ring to bring the succeeding slide into alignment with the horizontal and upright support arms 20 and 21 and arm 24. Thus the simplified control and transport mechanism of the invention as applied to slide viewing in its functional aspect is readily obvious. Its positive nature of control and alignment for the slide elements make the invention of major importance.

A separate clutch control device is provided operable to either run the device continuously to eliminate viewing time on slides when there is no desire to use a particular group of them or to interrupt the operation of the mechanism to maintain a single slide in viewing position for an extended time. The control circuit comprises as shown schematically in Fig. 1 a central or "hot" line from a power source having a two-way switch 62 connected therewith normally set in a neutral position. On closing the switch to the left in Fig. 1, when a slide is in viewing position, the solenoid 55 is energized to take away from cam 52 the control of switch 53 to maintain the stationary magnet 46 energized regardless of cam 52. Then when it is desired to continue the automatic showing, the switch is returned to a neutral position.

When it is desired to skip a series of slides, the switch 62 is closed to the right to close a circuit energizing the relay 59 closing contacts 60 and 61 and providing a separate circuit from power through microswitch 56 irrespective of the premature opening of the main switch 62. The cam 57 is on the same shaft as cam 52 and has five equidistantly spaced notches about its periphery, the angular distances between notches corresponding to the operating time for lowering a slide and raising another. The notches cooperate with switch arm 58 of the microswitch when the continuous run circuit is energized to insure that on release of the switch to a neutral position that cam 52 will take over only when a slide is in the viewing position. Thus if the switch is returned to a neutral position, the solenoid 54 will remain energized to maintain a continuous run position until the microswitch is opened by the switch arm 58 falling into a notch in cam 57 as a slide comes into a viewing position. This opens the circuit and the cam 52 takes over in the viewing position to continue the automatic operation of the slide viewing mechanism. The single practical embodiment of the invention presented here is particularly directed to the presentation of stereo-slides though as is also obvious the application of the subject invention apparatus is wide in scope as will be recognized by those skilled in the art and the many apparent mechanical modifications of the invention available are considered to be within the scope of the invention. Moreover, as is obvious, the control of the novel slide transport mechanism disclosed herein may be by manual means and yet retain inventive aspects.

It is further noted that with the simplified three-point slide holding mechanism disclosed herein, the slides presented are not subjected to irregularities in the slide holders as was common in the prior art slide holders which can tilt the slides so as to affect their proper projection.

While the usual manually operated projector has provisions for the operator to make image corrections from time to time as a show is in progress, an automatic projector arrangement does not permit such adjustment and therefore the mechanism effecting the successive transport of slides for viewing must be of necessity such as to provide a positive accurate presentation throughout its operation. This has been accomplished by the subject invention disclosed herein enabling a distinct advance in the art.

The economy of production and materials effected by the improved apparatus of the invention which may be applied to various type projectors, as well as its simplicity of operation and maintenance also brings a considerable advance to the art. The scope of the invention is intended to be limited only by the accompanying claims.

What is claimed is:

1. Slide transport apparatus comprising a platform, guide means in said platform, a frame movable in said guide means, control means connected with said frame for timed sequential movement of said frame, a rod fixed to the frame for movement therewith, a support for said rod, an open support arm extending at right angles to said support, a hollow drum type slide magazine mounted on said arm for rotation relative thereto having equidistantly spaced slots about its periphery adapted to receive slides therein, an arm extending perpendicular to said rod normally within said open support, a notched support element integral with said arm and perpendicular thereto arranged coaxial with the magazine axis in assembled relation, a rod extension mounted on said rod in biased relation thereto, an arm on said rod extension arranged parallel to the arm on said rod and having spaced engaging means for a slide depending therefrom in the plane of said vertical notched engaging element whereby on actuation of said control means said frame and connected rod will move outwardly of said platform to carry said vertical notched element into engagement with the bottom of a slide mounted in the drum and on continued movement will bring the upper surface of the slide into securing engagement with said depending engaging means for biased containment of the slide as it is moved into a viewing position clear of the magazine.

2. Slide transport apparatus comprising a platform, a support structure mounted on said platform, a slotted slide magazine mounted on said support for rotative movement relative thereto, a rod vertically mounted on said platform for movement relative thereto, control means mounted on said platform operatively connected to said rod for timed extension and retraction thereof, a first support arm having a notched vertical element thereon on said rod extending within said slotted magazine for alignment with the under surface of a slide in a slot in said magazine, an extension on said rod mounted in biased relation thereto having a second support arm on said extension parallel to said first support arm and having spaced depending notched portions in the plane of the notched vertical element for engagement with the upper surface of the slide, a ratchet element on said magazine, and a dog element on said rod for cooperation with said ratchet element whereby on actuation of said control means said rod will be extended to cause engagement of the slide by said first support arm to effect containment thereof between both said support arms and delivery of the slide into a viewing position and whereby on retraction of said rod the dog element will engage said ratchet element to rotate the magazine to bring a succeeding slide into alignment with said support arms.

3. Slide transport mechanism for use with a slotted type slide magazine comprising support means, a rod mounted for reciprocating movement in said support means, control means for said rod associated therewith and mounted on said support means, means for mounting a slotted type magazine on said support means for movement relative thereto, a first arm projecting from said rod substantially perpendicular to the longitudinal axis thereof and having a slide support element thereon arranged for insertion within the magazine, an extension mounted on said rod for movement relative thereto, biasing means connecting the rod and its extension to continuously maintain a biased relation therebetween, a second arm on said extension arranged parallel to and in the plane of said first arm having depending notched slide engaging elements adapted for disposition outside said magazine whereby on actuation of said control means the rod may be moved to bring the support element on the first arm into engagement with the bottom of a slide to bring the slide into engagement with said depending notched elements on said second arm to obtain a positive biased secured engagement of the slide thereby and bring the slide clear of the magine into a viewing position and means for moving said magazine connected to said rod upon retraction of a slide to bring a following slide into alignment with said first and second arms.

4. Apparatus for automatically presenting slides for viewing comprising a platform, support means extending vertically from said platform having a side extension providing a pivot member, a slotted drum type slide magazine mounted on said pivot member for rotation relative thereto, a rod member mounted in said support means for movement longitudinally thereof, control means for moving said rod member in one direction in timed sequence, an extension mounted on said rod member, for movement of said rod member relative thereto, extending upwardly of said support means, means connecting said rod member and extension providing a continuously biased relation, a first arm on said rod member extending within said slide magazine having a slide engaging member for engagement of the bottom of a first slide in a selected slot of said magazine, a second arm on said extension outwardly of said support means which support means provides a lower limit stop therefor, depending notched slide engaging elements on said second arm in the plane of the slide engaging member and normally spaced therefrom a greater distance than the height of the slide whereby on actuation of said control means, said slide engaging member will engage the lower surface of said first slide to bring the upper surface of said first slide into engagement with the depending notched elements to provide a biased secured engagement of said first slide and move it clear of the magazine into a viewing position, a ratchet ring incorporated on one side of said magazine remote from said pivot member, and a dog member pivotally mounted on said rod member for periodic engagement with said ratchet ring to rotate said magazine to transport the next slide into the plane of said first and second arms on retraction and release of said first slide by said arms and movement of said rod member in the opposite direction.

5. A slide transport apparatus for use with a slotted slide magazine comprising a platform, a rod mounted on said platform for intermittent reciprocating movement relative thereto, control means mounted on said platform for timed intermittent reciprocation of said rod, a support means on said platform for mounting a slide magazine for movement relative thereto, a first arm extending from said rod for extension within a magazine in assembled relation, a first notched support element on said arm adapted for substantial coaxial alignment with the vertical axis of the magazine and adapted for engagement of the under surface of a slide mounted in a slot in the magazine, an extension on said rod mounted in biased relation thereto having a second arm arranged parallel to said first arm, depending notched securing elements on said second arm arranged in the plane of said first notched supporting element for engagement with the upper surface of the slide whereby on actuation of the control means the rod will move to bring said first notched securing element into engagement with the undersurface of a slide and on continued movement of the rod the slide will engage the depending notched elements to provide a secured biased engagement of the slide and the movement of the slide into a viewing position, and dog means on said rod operable on retraction and release of said slide to rotate said magazine and move a succeeding slide into alignment with said first and second arms.

6. Automatic slide transport mechanism comprising a platform, a rod mounted on said platform for reciprocation relative thereto, a bearing structure for said rod connected to said platform, a support arm on said bearing structure at substantially right angles thereto, a slotted type slide magazine rotatably mounted on said support arm, a first slide engaging means connected to said rod and extending within the magazine in spaced relation to a slide mounted in one of said slots, an extension on said rod, said rod being relatively movable with respect to said extension, a second slide engaging means on said rod extension extending parallel to said first slide engaging means in normally spaced relation to the slide, the bearing structure serving as a lower limit stop therefor, rod control means operable to actuate said rod to bring said first slide engaging means into engagement with the under surface thereof and continuing to carry the upper surface thereof into a secured engagement with the second slide engaging means, the slide so contained into viewing position, means operably connected to said rod control means effective on the slide reaching a viewing position to automatically interrupt the actuation of the rod by the rod control means for a predetermined period of time, and cooperating means on said rod and said magazine operative on retraction and release of said slide by said slide engaging means to effect rotation of said magazine to bring a succeeding slide into alignment with said slide engaging means.

7. Automatic slide transport mechanism comprising a platform, a rod mounted on said platform for reciprocation relative thereto, a bearing structure for said rod connected to said platform, a support arm on said bearing structure at substantially right angles thereto, a slotted type slide magazine rotatably mounted on said support arm, a first slide engaging means connected to said rod and extending within the magazine in spaced relation to a slide mounted in one of said slots, an extension on said rod, said rod being relatively movable with respect to said extension, a second slide engaging means on said rod extension extending parallel to said first slide engaging means in normally spaced relation to the slide, the bearing structure serving as a lower limit stop therefor, rod control means operable to actuate said rod to bring said first slide engaging means into engagement with the under surface thereof and continuing to carry the upper surface thereof into a secured engagement with the second slide engaging means, the slide so contained into viewing position, means operably connected to said rod control means effective on the slide reaching a viewing position to automatically interrupt the actuation of the rod by the rod control means for a predetermined period of time, cooperating means on said rod and said magazine operative on retraction and release of said slide by said slide engaging means to effect rotation of said magazine to bring a succeeding slide into alignment with said slide engaging means, and means operably associated with said rod control means and operable to override said automatic means connected to said rod control means to effect a variation in the predetermined periods for viewing and operation of the said slide engaging means during automatic operation of the transport mechanism.

References Cited in the file of this patent

UNITED STATES PATENTS

| | | |
|---|---|---|
| 24,327 | Perry | June 7, 1859 |
| 788,470 | Jehn | Apr. 25, 1905 |
| 926,939 | Guerrant | July 6, 1909 |
| 1,082,260 | Braun | Dec. 23, 1913 |
| 1,141,456 | Frederiksen | June 1, 1915 |
| 1,142,158 | Fischbach | June 8, 1915 |
| 1,151,221 | Schwanhausser | Aug. 24, 1915 |
| 1,178,461 | Tilley et al. | Apr. 4, 1916 |
| 1,240,593 | Palmer | Sept. 18, 1917 |
| 1,328,192 | Pflaster | Jan. 13, 1920 |
| 1,594,952 | Headding et al. | Aug. 3, 1926 |
| 1,768,111 | Branger | June 24, 1930 |
| 2,076,924 | Spindler | Apr. 13, 1937 |
| 2,537,429 | Seyler | Jan. 9, 1951 |

FOREIGN PATENTS

| | | |
|---|---|---|
| 312,255 | Great Britain | May 23, 1929 |